(12) United States Patent
Seel et al.

(10) Patent No.: US 9,815,448 B2
(45) Date of Patent: Nov. 14, 2017

(54) METHOD FOR SIMPLIFYING TORQUE MONITORING, IN PARTICULAR FOR HYBRID DRIVES

(75) Inventors: Andreas Seel, Hemmingen (DE); Holger Niemann, Ludwigsburg (DE); Oliver Kaefer, Murr (DE); Per Hagman, Alingsas (SE)

(73) Assignee: ROBERT BOSCH GMBH, Stuttgart (DE)

( * ) Notice: Subject to any disclaimer, the term of this patent is extended or adjusted under 35 U.S.C. 154(b) by 1874 days.

(21) Appl. No.: 12/086,411

(22) PCT Filed: Dec. 20, 2006

(86) PCT No.: PCT/EP2006/069980
§ 371 (c)(1),
(2), (4) Date: Mar. 6, 2009

(87) PCT Pub. No.: WO2007/074121
PCT Pub. Date: Jul. 5, 2007

(65) Prior Publication Data
US 2009/0305842 A1  Dec. 10, 2009

(30) Foreign Application Priority Data

Dec. 29, 2005 (DE) .................. 10 2005 062 869

(51) Int. Cl.
*B60K 1/02* (2006.01)
*B60W 10/06* (2006.01)
(Continued)

(52) U.S. Cl.
CPC ............ *B60W 10/06* (2013.01); *B60W 10/08* (2013.01); *B60W 20/00* (2013.01); *G05D 17/02* (2013.01);
(Continued)

(58) Field of Classification Search
CPC ...... B60W 10/06; B60W 10/08; B60W 10/00; B60W 10/04; B60W 20/00; B60W 20/10; B60W 20/11; B60W 20/15; B60W 20/19
(Continued)

(56) References Cited

U.S. PATENT DOCUMENTS 5,939,848 A * 8/1999 Yano et al. ............... 318/139
6,054,844 A * 4/2000 Frank ...................... 322/16
(Continued)

FOREIGN PATENT DOCUMENTS

DE  197 39 564   3/1999
DE  197 39 565   3/1999
(Continued)

OTHER PUBLICATIONS

"Automotive Software Engineering, Grundlagen, Prozesse, Methoden and Werkzeuge", 2. Auflage, Autoren: Jörg Schäuffele, Thomas Zurawka; Vieweg Verlag! GWV Fachverlage GmbH, Wiesbaden 2004 (with English summary of pp. 113-115).
(Continued)

*Primary Examiner* — James M Dolak
(74) *Attorney, Agent, or Firm* — Norton Rose Fulbright US LLP; Gerard Messina

(57) ABSTRACT

In a method for controlling a vehicle drive unit having at least two individual drives and a vehicle control unit, a continuous torque comparison between a permissible torque $M_{Zul}$ and a further torque is performed by the control unit. The permissible torque $M_{Zul}$ is continuously compared to setpoint torques $M_{setpoint,V}$ and $M_{setpoint,E}$ for the least two individual drives.

8 Claims, 2 Drawing Sheets

(51) Int. Cl.
  *B60W 10/08* (2006.01)
  *B60W 20/00* (2016.01)
  *G05D 17/02* (2006.01)

(52) U.S. Cl.
  CPC .. *B60L 2240/486* (2013.01); *B60W 2710/105* (2013.01); *Y02T 10/6286* (2013.01); *Y10T 477/23* (2015.01)

(58) Field of Classification Search
  USPC ..... 180/65.265, 65.275, 65.285; 701/22, 51; 477/3; 475/2, 53
  See application file for complete search history.

(56) References Cited

U.S. PATENT DOCUMENTS

| | | | |
|---|---|---|---|
| 6,083,138 A * | 7/2000 | Aoyama et al. | 477/5 |
| 6,083,139 A * | 7/2000 | Deguchi et al. | 477/5 |
| 6,098,733 A * | 8/2000 | Ibaraki et al. | 180/65.28 |
| 6,223,721 B1 * | 5/2001 | Bauer et al. | 123/399 |
| 6,247,437 B1 * | 6/2001 | Yamaguchi et al. | 123/179.3 |
| 6,409,623 B1 * | 6/2002 | Hoshiya et al. | 475/5 |
| 6,440,037 B2 * | 8/2002 | Takagi et al. | 477/37 |
| 6,443,126 B1 * | 9/2002 | Morimoto et al. | 123/339.15 |
| 6,588,256 B2 * | 7/2003 | Gassner et al. | 73/114.15 |
| 6,603,215 B2 * | 8/2003 | Kuang et al. | 290/40 C |
| 6,742,487 B2 * | 6/2004 | Yamaguchi et al. | 123/179.3 |
| 6,854,444 B2 * | 2/2005 | Plagge et al. | 123/350 |
| 6,862,511 B1 * | 3/2005 | Phillips et al. | 701/54 |
| 6,881,167 B2 * | 4/2005 | Inada | 475/5 |
| 6,901,910 B2 * | 6/2005 | Hess et al. | 123/436 |
| 6,907,337 B2 * | 6/2005 | Phillips et al. | 701/51 |
| 6,964,192 B2 * | 11/2005 | Bauer et al. | 73/114.15 |
| 6,991,052 B2 * | 1/2006 | Nogi et al. | 180/65.235 |
| 7,021,409 B2 * | 4/2006 | Tamor | 180/65.25 |
| 7,076,356 B2 * | 7/2006 | Hubbard et al. | 701/55 |
| 7,089,095 B2 * | 8/2006 | Takami et al. | 701/22 |
| 7,179,195 B2 * | 2/2007 | Joe | 477/5 |
| 7,313,470 B2 * | 12/2007 | Zaremba et al. | 701/22 |
| 7,383,902 B2 * | 6/2008 | Matsuzaki et al. | 180/65.285 |
| 7,552,003 B2 * | 6/2009 | Suzuki et al. | 701/51 |
| 7,784,575 B2 * | 8/2010 | Yamanaka et al. | 180/65.275 |
| 7,840,337 B2 * | 11/2010 | Zillmer et al. | 701/114 |
| 8,061,463 B2 * | 11/2011 | Kitano et al. | 180/65.285 |
| 8,195,374 B2 * | 6/2012 | Suzuki et al. | 701/22 |
| 8,606,488 B2 * | 12/2013 | Falkenstein | 701/110 |
| 8,657,389 B2 * | 2/2014 | Post, II | B60K 28/16 180/197 |
| 8,660,724 B2 * | 2/2014 | Tarasinski | B60K 6/48 180/65.21 |
| 8,989,970 B2 * | 3/2015 | Murray | F16H 59/48 475/120 |
| 9,073,553 B2 * | 7/2015 | Akiyama | B60Q 1/12 |
| 9,079,574 B2 * | 7/2015 | Burke | B60W 10/06 |
| 9,085,227 B2 * | 7/2015 | Fournier | B60K 6/445 |
| 2002/0065162 A1 * | 5/2002 | Kaneko et al. | 475/2 |
| 2004/0009842 A1 * | 1/2004 | Inada | 477/5 |
| 2004/0152558 A1 * | 8/2004 | Takami et al. | 477/3 |
| 2004/0235614 A1 * | 11/2004 | Tajima et al. | 477/3 |

FOREIGN PATENT DOCUMENTS

| | | |
|---|---|---|
| DE | 197 39 567 | 3/1999 |
| DE | 101 16 749 | 10/2001 |
| DE | 101 10 965 | 12/2001 |
| DE | 101 40 810 | 5/2002 |
| DE | 102 30 833 | 2/2003 |
| DE | 103 61 031 | 7/2004 |
| DE | 10 2004 013581 | 11/2004 |
| DE | 103 20 017 | 12/2004 |
| DE | 10 2004 022 767 | 7/2005 |
| DE | 10 2005 010883 | 11/2005 |
| JP | 2000-213386 | 8/2000 |
| JP | 2000213386 | 8/2000 |
| JP | 2003-219509 | 7/2003 |
| JP | 2004-312935 | 11/2004 |
| JP | 2004312935 | 11/2004 |

OTHER PUBLICATIONS

"Kraftfahr technisches taschenbuch—Bosch", 22. Auflage: Verlagsgruppe Weltbild GmbH, Augsburg 2004 (with English translation).

* cited by examiner

METHOD FOR SIMPLIFYING TORQUE MONITORING, IN PARTICULAR FOR HYBRID DRIVES

BACKGROUND OF THE INVENTION

1. Field of the Invention

The present invention relates to a method and a device for monitoring torque output of a drive unit.

2. Description of Related Art

A control unit for the drive unit of a motor vehicle is known from published German patent document DE 103 20 017, the control unit in particular controlling or regulating the drive unit in regard to an output drive torque and the drive unit being an internal combustion engine of a motor vehicle. The motor vehicle typically includes a driver input transmission device actuatable by the driver of the motor vehicle, in particular a gas pedal actuatable using the foot. This is provided to output an output signal representing an instantaneous actuation state of the driver input transmission device. A control unit receives the output signal from the driver input transmission device and assigns the received output signal at least one setpoint output variable, which is in particular a setpoint drive torque of the drive unit. The drive unit is activated by the control unit in such a way that an actual output variable output by the drive unit approximates the setpoint output variable. Control units of this type are known in various designs for typical motor vehicle engines, in particular gasoline engines and diesel engines, e.g., Bosch engine-control systems having an electronic gas pedal (EGAS).

Furthermore, performing continuous torque monitoring to discover malfunctions in control units is known. This is used to protect passengers in the motor vehicle and to protect external traffic participants. Unintended acceleration of the vehicle is to be avoided by continuous torque monitoring. The core of continuous torque monitoring is a comparison of an actual torque provided by the engine to a permissible torque. In the normal case, the actual torque is less than the permissible torque. If the actual torque exceeds the permissible torque, an error exists in the engine control unit, and an error response resulting in a safer vehicle state is initiated. Monitoring of the engine control unit is typically performed according to a 3-level monitoring concept. The engine control itself, in particular presetting the setpoint torque, is performed in the first level, referred to as the functional level. The second level (monitoring level) is implemented as continuous torque monitoring. In this level, a permissible torque is ascertained as a function of vehicle and engine functions, inter alia, and compared to an actual engine torque. The second level is made secure in a complex manner, e.g., by double saving of all variables, cyclic RAM and ROM testing, program sequence controls, and command tests. The third level is used for computer security.

Published German patent document DE 197 39 565 discloses a method for controlling the torque of a drive unit of a motor vehicle, in which the torque of the drive unit is set at least according to the measure of the driver input, the actual torque of the drive unit being determined and a maximum permissible torque being ascertained at least on the basis of the driver input. A torque reduction and/or torque limiting occurs if the maximum permissible torque is exceeded by the actual torque. At least one operating state is established in which the torque of the drive unit is increased due to additional load. During this at least one operating state, the maximum permissible torque is increased. In particular, the permissible torque is thus increased during operation with a cold drive unit and/or during operation of high-load consumers.

The described methods for torque monitoring originating from the related art may not be transferred to hybrid vehicles without further measures. In hybrid vehicles, at least one further torque source (motor) is used in addition to an internal combustion engine. In most cases, it is an electric drive. In the engine controller, the desired torque requested by the driver, which is set by operation of a gas pedal, must be distributed to the existing torque source, which includes at least two motors. This is performed as a function of numerous surroundings variables, inter alia, with the goal of setting the operating point which is most favorable for consumption for all torque sources, i.e., drive motors. The core of the above-mentioned continuous torque monitoring is the torque comparison in the second level, the monitoring level, in which a permissible torque of the second level (monitoring level) is compared to an actual torque in the second level (monitoring level). If the actual torque exceeds the permissible torque, a corresponding error response is initiated. The calculation of the permissible torque in the second level (monitoring level) forms the functionality of the first level, the functional level. In the second level (monitoring level), the calculations from the first level (functional level) are performed once again, but greatly simplified, to reduce possible errors. In hybrid vehicles, a torque request (setpoint torque) is sent to the individual torque sources, i.e., the motors, by the vehicle controller. The actually output torque (actual torque) may deviate from this setpoint torque, however, because the motor control units may have intrinsic functionalities which elevate torque, such as idling regulators and auxiliary system compensators. In addition, the inertia of the torque sources of the motors causes a dynamic torque deviation. These deviations must be simulated in the calculation of the permissible torque in the second level (monitoring level) to prevent erroneous response of the torque monitoring unit. This represents a high level of complexity in regard to the development and calibration of the second level.

BRIEF SUMMARY OF THE INVENTION

The method according to the present invention for simplifying torque monitoring in hybrid vehicles avoids the disadvantages of the methods known from the related art. In particular, the method according to the present invention allows the development and calibration complexity for torque monitoring of hybrid drives to be significantly reduced. The torque comparison between the permissible torque and the actual torque in the vehicle control unit occurring up to this point within the scope of continuous torque monitoring is replaced by the torque comparison between the permissible torque and the setpoint torque.

In continuous torque monitoring presently known from the related art, the complete intrinsic torque functionality of the torque sources used is simulated in the second level (monitoring level) of the vehicle control unit to allow a torque comparison of the permissible torque $M_{Zul}$ to the actual torque $M_{actual}$. This means a simulation of the intrinsic torque functionality of an internal combustion engine and a simulation of the complete intrinsic torque functionality of an electric motor in the case of a hybrid vehicle having an internal combustion engine and an electric drive. In the second level, the monitoring level, the dynamic torque response of the torque sources used must also be simulated. The complexity for this purpose is very high in a hybrid vehicle having an internal combustion engine and two electric drives, for example. A change in the control unit of one of the drives used of a hybrid drive automatically results in a change of the second level, the monitoring level, in the vehicle control unit in this approach. A very high level of complexity in regard to the monitoring development thus results in the event of changes in the drivetrain of a hybrid vehicle.

Through the approach according to the present invention, to perform a torque comparison between the permissible torque and the setpoint torque for continuous torque monitoring, the necessity of simulating the functionalities of the particular torque sources used, i.e., the motors, is dispensed with in the second level, the monitoring level. A majority of the development and calibration complexity otherwise to be performed for the second level (monitoring level) is thus dispensed with. The torque comparison according to the present invention allows monitoring of the correct function of the vehicle control unit. According to the approach according to the present invention, the calculation of the setpoint torque is monitored. For the reliable function of the monitoring, it is necessary for the particular engine control units assigned to the drives used to be intrinsically reliable. A comparison between the setpoint torque and the actual torque will therefore also occur in the engine control units and is moved out of the vehicle control unit.

A further advantage achievable by the approach according to the present invention is that a better modularization of the monitoring concept is provided by the approach suggested according to the present invention. Thus, for example, a change in the drivetrain in the form of using another electric motor does not result in a change in regard to the monitoring of the vehicle controller, for example. This means that in regard to the vehicle control unit, its first level (functional level), its second level (monitoring level), and the third level for securing the computer are not affected by a change in the drivetrain and accordingly no adaptation is necessary to the newly used components in the drivetrain of a hybrid drive.

DETAILED DESCRIPTION OF THE INVENTION

Figure 1:
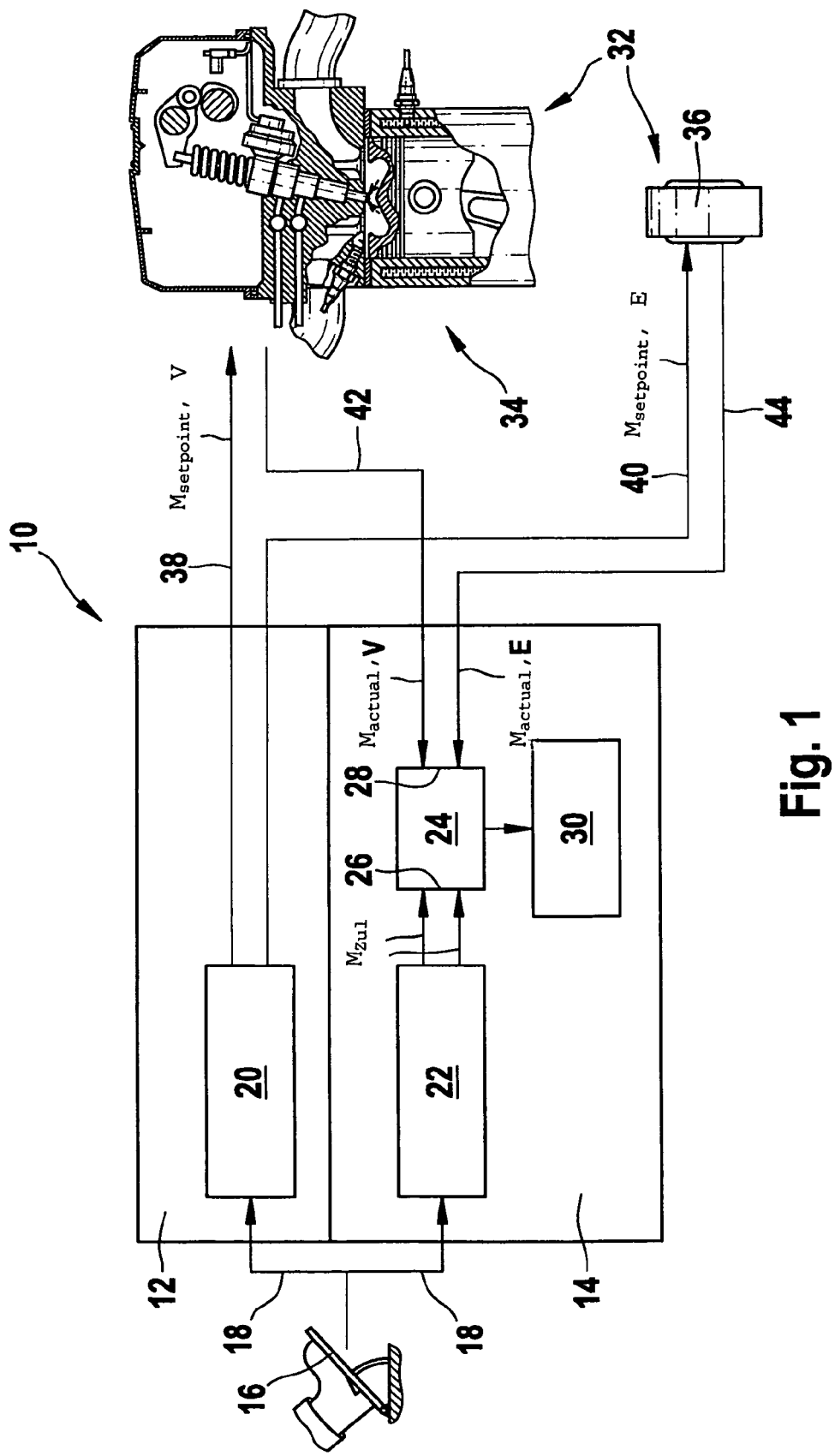
FIG. 1 shows a comparison to be performed within the scope of continuous torque monitoring between permissible torque $M_{Zul}$ and actual torque $M_{actual}$ according to the related art.

The illustration in FIG. 1 shows a torque comparison between a permissible torque $M_{Zul}$ and an actual torque $M_{actual}$ in a hybrid drive within a vehicle control unit.

A vehicle control unit 10 includes a first level, which is referred to as a functional level, and a second level, indicated by reference numeral 14, which is used as the monitoring level of the first level, reference numeral 12. Vehicle control unit 10 additionally also includes a third level (not shown in FIG. 1), which is used to secure a computer architecture.

Setpoint values 18, in regard to an acceleration of a hybrid vehicle, for example, are transmitted via a gas pedal 16, which is used as the driver input transmission device, to vehicle control unit 10. Within the first level, identified by reference numeral 12, the functional level, a setpoint torque $M_{setpoint}$ is calculated in a calculation stage 20. Parallel thereto, a permissible torque $M_{Zul}$ is calculated in a calculation stage 22. The values calculated in calculation stage 20 for setpoint torque $M_{setpoint}$, for setpoint torque value $M_{setpoint,V}$ 38, and setpoint torque value $M_{setpoint,E}$ 40 are transmitted to a hybrid drive 32, which includes an internal combustion engine 34 and at least one electric drive 36 in the example shown in FIG. 1. Internal combustion engine 34 represents a first torque source and electric drive 36 represents a second torque source.

The values calculated in the second level, reference numeral 14, in calculation stage 22 for permissible torques $M_{Zul}$ are transmitted to a comparison stage 24. Comparison stage 24 includes an input 26 for the values of permissible torques $M_{Zul}$ as well as inputs 28 for the values of actual torques of both internal combustion engine 34 and the at least one employed electric drive 36. Hybrid drive 32 may also include two or more electric drives, of course. Actual torque $M_{actual,V}$ acknowledged via an acknowledgment 42 to comparison stage 24 by internal combustion engine 34, and actual torque $M_{actual,E}$ acknowledged via an acknowledgment 44 from the at least one electric drive 36 to comparison stage 24 are compared to one another in comparison stage 24 within the second level, reference numeral 14, within the scope of a torque comparison. If the actual torque exceeds the permissible torque, an error response 30 is initiated.

According to the torque comparison shown in FIG. 1, the torque request of setpoint torques $M_{setpoint,V}$ 38 and $M_{setpoint,E}$ 40 are transmitted to hybrid drive 32 from vehicle control unit 10. Actual torques $M_{actual,V}$ 42 and $M_{actual,E}$ 44 actually output by hybrid drive 32 may deviate from setpoint torques $M_{setpoint,V}$ 38 and $M_{setpoint,E}$ 40, however, because the control units of both internal combustion engine 34 and the at least one electric drive 36 of hybrid drive 32 have intrinsic functionalities which increase torque, such as idling regulators, driving aids, and compensators for auxiliary systems, such as radiator fans which turn on, for example, and further electrical consumers which may be switched into the vehicle system of a motor vehicle, such as a rear windshield heater. These deviations, resulting because of the torque-increasing intrinsic functionality, have to be simulated in the calculation of permissible torque $M_{Zul}$ in the second level, i.e., the monitoring level, reference numeral 14, to prevent an erroneous response of the torque monitoring unit.

Figure 2:
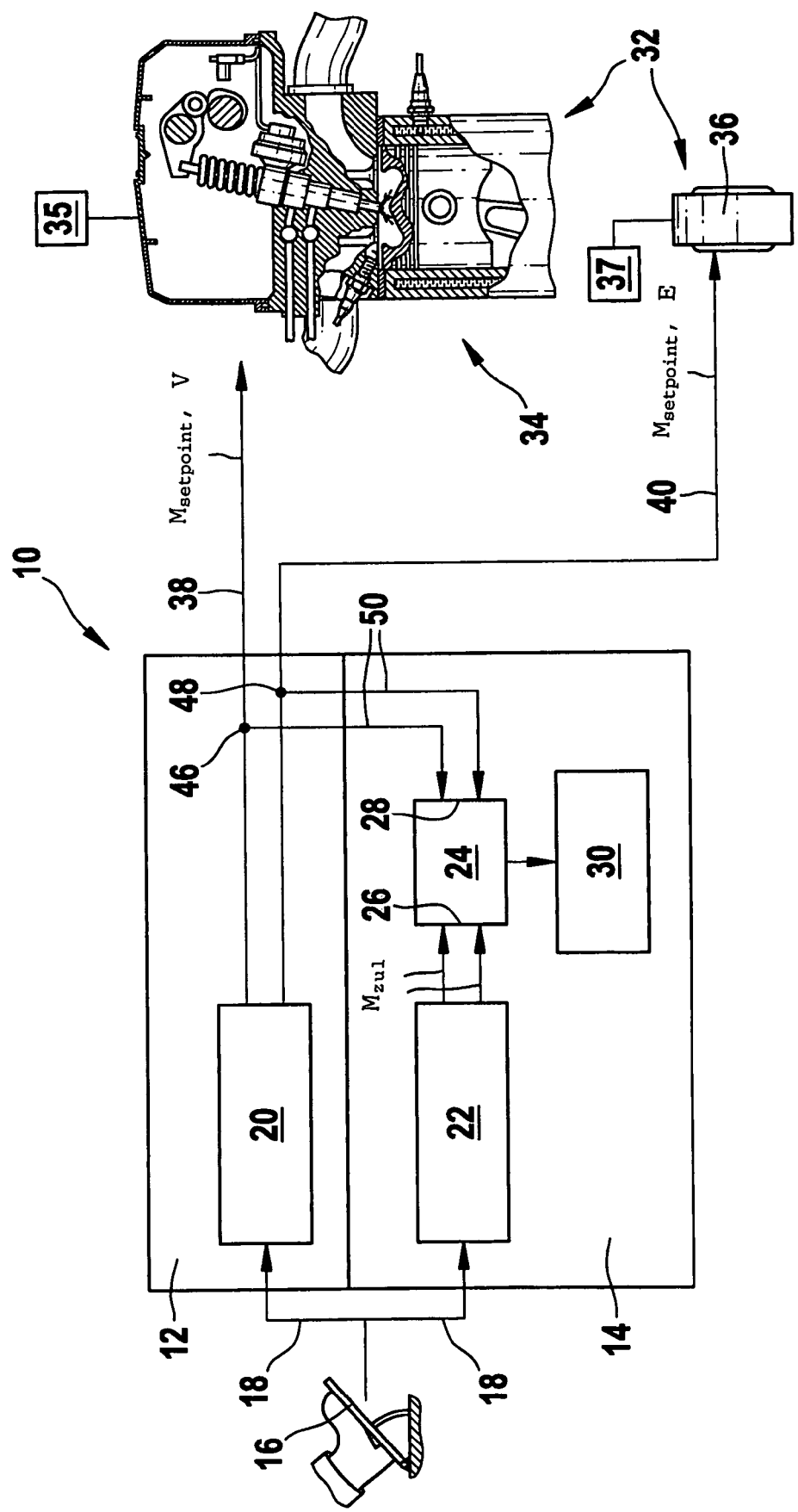
FIG. 2 shows continuous torque monitoring in which a torque comparison is performed between permissible torque $M_{Zul}$ and setpoint torque $M_{setpoint}$.

FIG. 2 shows torque comparisons between permissible torques $M_{Zul}$ and setpoint torques $M_{setpoint}$ within the vehicle control unit.

According to the method of the present invention, the torque values ascertained in calculation stage 20 for particular setpoint torques $M_{setpoint,V}$ 38 and $M_{setpoint,E}$ 40 are tapped at tap points 46 and 48 and the particular torque values for setpoint torques $M_{setpoint,V}$ 38 and $M_{setpoint,E}$ 40 are supplied within vehicle control unit 10 to comparison stage 24 via signal lines 50. In comparison stage 24, a torque comparison is performed between permissible torque $M_{Zul}$ in calculation stage 22 of second level, reference numeral 14, and the values ascertained in the first level, functional level, reference numeral 12, in calculation stage 20 for setpoint torques $M_{setpoint,V}$ 38 and $M_{setpoint,E}$ 40, without particular actual torque values (compare illustration in FIG. 1) $M_{actual,V}$ 42 and $M_{actual,E}$ 44 being taken into consideration. Deviations are thus eliminated, which may result because of torque-increasing intrinsic functionalities of hybrid drive 32, in particular of internal combustion engine 34 or of electric drive 36, so that an erroneous response of the torque monitoring unit may be precluded due to these effects.

The complexity in development and adaptation of the torque monitoring unit may be significantly simplified by the signal flow according to the present invention shown in FIG. 2 within the scope of the method suggested according to the present invention. In particular, a complexity otherwise to be incurred in the second level, i.e., the monitoring level, reference numeral 14, in regard to the simulation of the complete torque intrinsic functionalities of internal combustion engine 34 and at least one electric drive 36 of hybrid drive 32 may be avoided. The simulation of the dynamic torque behavior of both internal combustion engine 34 and electric drive 36 in the second level, monitoring level 14, may also be bypassed following the approach suggested according to the present invention. Furthermore, the approach suggested according to the present invention offers the option of moving the comparison between setpoint torque and actual torque both in regard to internal combustion engine 34 and the at least one electric drive 36 into control units 35, 37 assigned to these units and accordingly moving this comparison out of vehicle control unit 10. An improvement of the modularization of the monitoring concept is thus achieved. A change in the drivetrain of a hybrid drive, given by the use of another electric drive 36, for example, does not require any changes in the first level, reference numeral 12, the functional level, or in the second level, reference numeral 14, the monitoring level.

The continuous torque comparison suggested according to the present invention between setpoint torque $M_{setpoint,V}$ 38 and $M_{setpoint,E}$ 40 in comparison stage 24 and permissible torque $M_{Zul}$ in particular prevents the complexity incurred in replacing units of hybrid drive 32 in the second level, reference numeral 14 (monitoring level) in regard to an adaptation of the intrinsic torque functionality of either internal combustion engine 34 or the at least one electric drive 36. Furthermore, in regard to vehicle control unit 10, two additional interfaces which were necessary in the previous approaches for transmitting actual torque $M_{actual,V}$ 42 and $M_{actual,E}$ 44 within the scope of a torque comparison according to the illustration in FIG. 1 are no longer needed. Vehicle control unit 10 performs the torque comparison in comparison stage 24 for continuous torque monitoring between the first level, i.e., the functional level, reference numeral 12, and the second level, i.e., the monitoring level, reference numeral 14, because the values for setpoint torques $M_{setpoint,V}$ 38 and $M_{setpoint,E}$ 40 required for comparison in comparison stage 24 are already transmitted within vehicle control unit 10 from the first level, the functional level, into the second level, the monitoring level.

FIG. 2 shows that permissible torques $M_{Zul}$ are ascertained for all drives, internal combustion engine 34 and the at least one electric drive 36. This means that for every drive present within hybrid drive 32, a separate permissible torque $M_{Zul}$ especially assigned to this drive is ascertained. Alternatively, a summed permissible torque $M_{Zul}$ may be ascertained in calculation stage 22, which results from the summation of permissible torques $M_{Zul}$ of the individual drives used in hybrid drive 32. Two embodiments of the torque comparison in comparison stage 24 result therefrom. On one hand—as shown in FIG. 2—an individual setpoint torque comparison of individual permissible torques $M_{Zul}$ to $M_{setpoint,V}$ 38 and $M_{setpoint,E}$ 40 and on the other hand a total setpoint torque comparison may be performed. In the total setpoint torque comparison, the sum of setpoint torques $M_{setpoint,V}$ 38 and $M_{setpoint,E}$ 40—in a hybrid drive 32 having two torque sources—are compared to summed permissible torque $M_{Zul}$ ascertained in calculation stage 22. Both variants are possible using the method suggested according to the present invention.

What is claimed is:

1. A method for torque monitoring of a vehicle drive unit having at least a first drive and a second drive, comprising:
   ascertaining respective maximum permissible torques for each of the first and second drives in a calculation stage of a control unit;
   performing a continuous torque comparison in a comparison stage of the control unit (i) between a setpoint torque for the first drive and the ascertained maximum permissible torque for the first drive, and (ii) between a setpoint torque for the second drive and the ascertained maximum permissible torque for the second drive.

2. The method as recited in claim 1, further comprising:
   ascertaining a summed permissible torque for a combination of the first and second drives in the calculation stage; and
   ascertaining a summed setpoint torque for a combination of the first and second drives.

3. The method as recited in claim 2, wherein the summed setpoint torque for the combination of the first and second drives is compared to the summed permissible torque for the combination of the first and second drives in the comparison stage.

4. The method as recited in claim 1, wherein the first drive is an internal combustion engine and the second drive is an electric drive, and wherein the setpoint torques for the first and second drives are calculated within the vehicle control unit.

5. The method as recited in claim 1, wherein the setpoint torques for the first and second drives are calculated within the vehicle control unit in a first level which is a functional level, and wherein the setpoint torques for the first and second drives are compared to the ascertained respective permissible torques for the first and second drives in a second level which is a monitoring level.

6. The method as recited in claim 4, wherein the setpoint torques for the first and second drives calculated in the vehicle control unit are compared to respective actual torques of the first and second drives in respective control units assigned to the first and second drives.

7. The method as recited in claim 5, wherein, for the comparison to the ascertained respective permissible torques for the first and second drives, the setpoint torques for the first and second drives are obtained at tap points within the first level which is the functional level.

8. The method as recited in claim 5, wherein the setpoint torques for the first and second drives are transmitted to the comparison stage for continuous torque monitoring, wherein the comparison stage is provided in the second level which is the monitoring level.

* * * * *